July 16, 1929.  E. J. WESP  1,721,363
ADJUSTABLE BEARING
Filed Aug. 4, 1928  2 Sheets-Sheet 1

Inventor
Edward J. Wesp
By Harry Prease
Attorney

Inventor
Edward J. Wesp
By Harry Pease.  Attorney

Patented July 16, 1929.

1,721,363

UNITED STATES PATENT OFFICE.

EDWARD J. WESP, OF CANTON, OHIO, ASSIGNOR TO THE CANTON FOUNDRY & MACHINE COMPANY, OF CANTON, OHIO, A CORPORATION OF OHIO.

ADJUSTABLE BEARING.

Application filed August 4, 1928. Serial No. 297,563.

The invention relates to adjustable bearings and more particularly to adjustable thrust bearings for apparatus such as alligator shears and the like and is an improvement upon my prior Patent No. 1,662,094, dated March 13, 1928.

Alligator shears, to which the invention is particularly adapted, include a pair of fixed spaced bearing members between which a movable shear blade is journaled. The bearing to which the invention pertains comprises a pair of wedge members interposed between one of the fixed bearing members and the movable shear blade with means for drawing the wedge members together in order to take up the wear and maintain the shear blade in aligned position with relation to the fixed cutting member.

It has been found that with such a construction there is a tendency for the wedge members to creep toward each other due to the oscillation of the cutting blade, causing the cutting blade to bind between the fixed bearings. It has also been found that it is desirable to hold the wedge members in fixed position with relation to the cutting blade in order to prevent the same from rotating upon the bearing shaft as the blade is oscillated.

The object of the improvement is to provide means for holding the two wedge members in any fixed adjustment to prevent their creeping toward each other; and to provide for holding the wedge members in fixed position with relation to the cutting blade.

Figure 1:
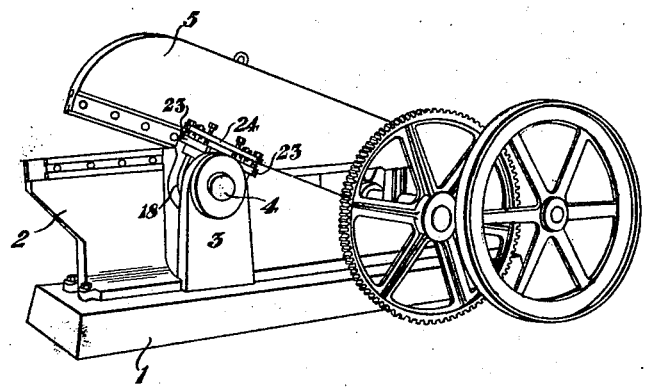
Figures 4, 5:
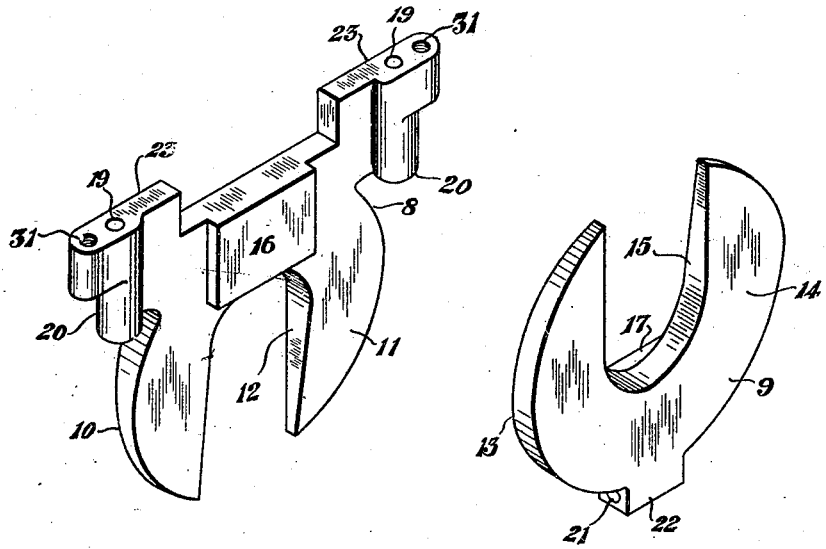
Figure 3:
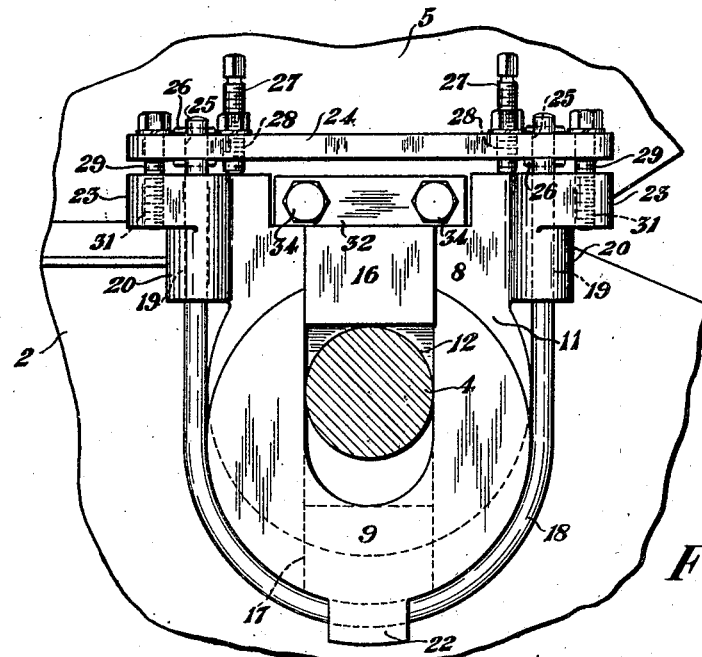
Figure 2:
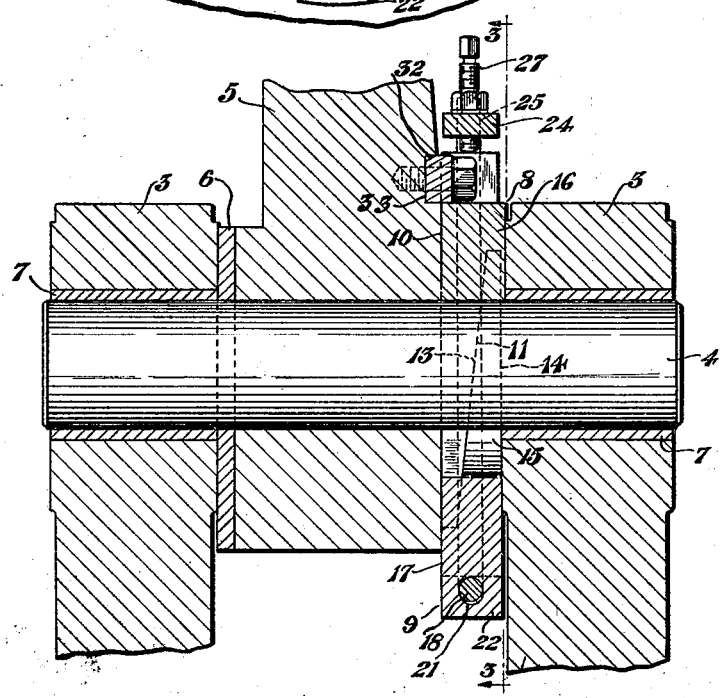

The above and other objects may be attained by constructing the bearing in the manner illustrated in the accompanying drawings, in which Figure 1 is a perspective view of an alligator shear equipped with the improved thrust bearing;

Fig. 2, a vertical section through the housing and shear blade or arm of the alligator shear, showing the improved thrust bearing thereon;

Fig. 3, a section taken substantially on the line 3—3, Fig. 2;

Fig. 4, a detail perspective view of one of the wedge members of the thrust bearing; and Fig. 5, a similar view of the other wedge member.

Similar numerals refer to similar parts throughout the drawings.

The alligator shear to which the invention is particularly adapted may include the base 1 upon which is mounted the fixed cutting member 2 and the spaced stationary bearing members 3 in which is journaled the shaft 4, the movable cutting blade or shear arm 5 being journaled upon the shaft between said fixed bearing members.

A plain thrust washer 6 may be interposed upon the shaft, between the movable cutting blade 5 and one of the fixed bearings 3 and bushings 7 may be provided around the shaft within each of the fixed bearings.

The adjustable bearing may comprises a pair of thrust washers or wedge members indicated generally at 8 and 9, having opposite faces inclined to each other, and adapted to be interposed between the movable cutting blade and the other fixed bearing 3.

The wedge member or thrust washer 8 has one face 10 located at right angles to the axis of the shaft 4 and adapted to be located against the adjacent face of the cutting arm or movable blade 5, the other face 11 of the wedge member being inclined to the axis of the shaft.

This wedge member is preferably slotted or cut away in U-shape as shown at 12 to permit the same to be slidably adjusted in a plane transverse to the axis of the shaft.

The other wedge member 9 has the inclined face 13 adapted to engage the inclined face 11 of the member 8, its other face 14 being located at right angles to the axis of the shaft 4.

This wedge member is also slotted or cut away in U-shape as shown at 15, the slot being in the upper side thereof while the slot 12 is in the lower side of the member 8. This permits the two wedge members to be adjusted toward and from each other around the shaft and between the cutting blade and the adjacent stationary bearing 3.

For the purpose of holding the wedge members 8 and 9 in position with relation to each other, the squared projection or block 16 may be formed upon the outer face of the member 8 to be received in the slot or cut-out portion 15 of the wedge member 9 and permit the wedge members to be slidably moved toward or from each other without any turning of either wedge member with reference to the other.

A similar lug 17 may be formed upon the lower portion of the wedge member 9, upon the face thereof toward the member 8, to be received within the slot or cut-out portion 12 thereof for the same purpose.

For the purpose of drawing the wedge members 8 and 9 toward each other a substantially U-shaped rod 18 may be provided, the ends thereof projecting upward through openings 19 in the lugs or bosses 20 formed at opposite sides of the wedge member 8. This U-shaped rod encircles the wedge member 9 and is preferably located through the opening 21 formed in the lug 22 in the lower end of the wedge member 8.

A pair of bosses or blocks 23 is formed upon the upper portion of the wedge member 8, above the lugs 20 and the free ends of the U-bar 18 are slidably located through the openings 19 which extend therethrough.

A bar 24 is located above the blocks or bosses 23 and connected to the end portions of the U-rod 18 in any suitable and well known manner. As illustrated, the ends of the rod are extended through apertures 25 in the bar and pins 26 are driven through the end portions of the rod above and below the bar.

For the purpose of drawing the wedge members 8 and 9 toward each other, to adjust the bearing, set screws 27 may be threaded through tapped openings 28 on the bar 24 and arranged to bear upon the top surfaces of the blocks or bosses 23.

In order to hold the wedge members in adjusted position, and prevent creeping of the same toward each other and for separating the wedge members apart in a direction opposite to the way in which they may have been drawn together, for adjusting the bearing, cap screws 29 may be located through apertures 13 in the bar 24 and threaded into the tapped openings 31 in the blocks or bosses 23.

Since the U-rod 18 is located through the opening 21 in the lug 22 of the wedge member 9, it will be seen that there can be no movement of the wedge member 9 relative to the U-rod 18. Thus, by holding the bar 24, and with it the U-rod 18, against movement relative to the wedge member 8, the two wedge members may be held in any adjusted position with relation to each other, preventing their creeping toward each other and binding the movable shear blade.

In order to prevent movement of the wedge members 8 and 9 with reference to the movable shear blade, a plate or block 32 may be butted against the upper edge of the wedge member 8 and partially received within a recess 33 formed in the adjacent face of the shear blade 5, being fixed in this position as by the screws 34.

The operation of this adjustable bearing will be obvious from the drawings and the above description. Assuming that the thrust load has caused a wearing of any of the wearing surfaces, the movable blade or shear arm 5 would be permitted to move longitudinally upon the shaft 4, allowing the separation of the shearing edges of the blade 5 and fixed cutter 2.

By loosening the cap screws 29 and tightening the set screws 27, the wedge members 8 and 9 may be drawn toward each other, the inclined co-acting faces thereof compensating for the wear upon the bearing surfaces and abutting the movable shear arm 5 against the washer 6 as tightly as may be desired.

With this adjustment obtained the cap screws 29 are again tightened to hold the parts in the adjusted position and prevent creeping of the wedge members toward each other.

I claim:

1. An adjustable bearing for alligator shears and the like including a pair of washers, each washer having opposite faces inclined to each other, one face of one washer abutting one face of the other washer, and adjustable means maintaining the washers in any fixed adjusted position and in abutment with each other and including a U-rod engirdling peripheral portions of one washer and connected thereto, and means positively adjustable in opposite directions securing the ends of the U-rod to the other washer.

2. An adjustable bearing for alligator shears and the like including a pair of washers, each of the washers having opposite faces inclined to each other, one face of one washer abutting one face of the other washer, and adjustable means maintaining the washers in abutment with each other and including a U-rod engirdling peripheral portions of one washer and connected thereto, a bar fixed to the ends of the U-rod, and means adjustably securing the bar to the other washer.

3. An adjustable bearing for alligator shears and the like including a pair of washers, each washer having opposite faces inclined to each other, one face of one washer abutting one face of the other washer, and adjustable means maintaining the washers in any fixed adjusted position and in abutment with each other and including a rod connected to one washer, and means positively adjustable in opposite directions securing the end of the rod to the other washer.

4. An adjustable bearing for alligator shears and the like including a pair of washers, each washer having opposite faces inclined to each other, one face of one washer abutting one face of the other washer, and adjustable means maintaining the washers in any fixed adjusted position and in abutment with each other and including a rod connected to one washer, a bar fixed to the end of the rod, and means positively adjustable in opposite directions securing the bar to the other washer.

5. An adjustable bearing for alligator shears and the like including a pair of washers, each of the washers having opposite faces inclined to each other, one face of one washer abutting one face of the other washer, and adjustable means maintaining the washers in abutment with each other and including a U-rod engirdling peripheral portions of one washer and connected thereto, a bar fixed to the ends of the U-rod, and a screw adjustably securing the bar to the other washer.

6. An adjustable bearing for alligator shears and the like including a pair of washers, each of the washers having opposite faces inclined to each other, one face of one washer abutting one face of the other washer, and adjustable means maintaining the washers in abutment with each other and including a U-rod engirdling peripheral portions of one washer and connected thereto, a bar fixed to the ends of the U-rod, and a cap screw and a set screw for adjustably securing the bar to the other washer.

In testimony that I claim the above, I have hereunto subscribed my name.

EDWARD J. WESP.